US005815390A

United States Patent [19]

Lakshmikumar

[11] Patent Number: 5,815,390

[45] Date of Patent: Sep. 29, 1998

[54] VOLTAGE-TO-CURRENT CONVERTER

[75] Inventor: Kadaba R. Lakshmikumar, Somerset County, N.J.

[73] Assignee: Lucent Technologies Inc., Murray Hill, N.J.

[21] Appl. No.: 724,630

[22] Filed: Oct. 1, 1996

[51] Int. Cl.[6] ................................ G05F 3/16; H02M 7/00

[52] U.S. Cl. ............................. 363/73; 323/315; 327/103

[58] Field of Search .............................. 363/73; 327/103, 327/563; 330/253, 257; 323/315

[56] References Cited

U.S. PATENT DOCUMENTS

| | | | |
|---|---|---|---|
| 3,585,539 | 6/1971 | Rao | 333/215 |
| 5,313,121 | 5/1994 | Cianci et al. | 327/103 |
| 5,359,298 | 10/1994 | Abe | 331/2 |
| 5,519,309 | 5/1996 | Smith | 323/316 |
| 5,598,117 | 1/1997 | Deguchi | 327/103 |
| 5,619,125 | 4/1997 | Lakshmikumar | 363/73 |

*Primary Examiner*—Stuart N. Hecker

[57] ABSTRACT

A rail-to-rail voltage-to-current converter converts a variable differential voltage signal having first and second voltage signal components, to an output current signal. The converter includes a first voltage-to-current converter configured to receive a voltage signal component and a reference voltage signal to provide a substantially linear output current signal. A second voltage-to-current converter receives the other one of the voltage signal components and the reference voltage signal to provide a second substantially linear output current signal. An adder combines the first and second output current signals to provide a substantially linear voltage/current characteristic over a wide range of available voltage signals generated by a power supply.

18 Claims, 4 Drawing Sheets

VOLTAGE-TO-CURRENT CONVERTER

TECHNICAL FIELD

The present invention relates to signal converters, and, more specifically, to a voltage-to-current converter.

BACKGROUND OF THE INVENTION

Voltage-to-current converters are used in many electronic applications. In some of these applications it is desired to generate a current signal in response to an input voltage signal. Conventional voltage-to-current converters may only respond linearly to input voltage signals within a voltage range that is smaller than the entire voltage range generated by a direct current (DC) power supply that drives the voltage-to-current converter. For example, a phase-locked loop may include a voltage-to-current converter that provides a current signal to a current-controlled oscillator in response to a control voltage signal. In certain phase-locked loop applications, it is desirable to use a voltage-to-current converter that has a substantially linear voltage/current characteristic over substantially the entire available power supply voltage signal range, so as to have a low oscillator gain and yet have the phase-locked loop operate over a wide range of process and temperature variations. A voltage-to-current converter exhibiting such a characteristic is referred to herein as rail-to-rail voltage-to-current converter.

Furthermore, in applications where the amplitude of the operating direct current (DC) voltage supply signal is relatively small, such as three volts, for example, a voltage-to-current converter that exhibits a substantially linear characteristic over substantially the entire range of input voltage signals is even more desirable. This follows, because the available dynamic range of input voltage signal is, at least in part, limited to the amplitude of the voltage supply signal. With a voltage-to-current converter that has a substantially linear current/voltage characteristic, the phase-locked loop may remain in a stable condition in response to phase-locked loop input signals having a wide range of frequencies. As the frequency of input signal varies, so does the input voltage signal applied to voltage-to-current converter. However, because the characteristic of converter remains substantially linear, the phase-locked loop may be able to operate over a wider range of input signals, and still exhibit the same dynamic behavior. Conversely, for a given range of input frequencies, and a given loop bandwidth, the oscillator can have a lower gain leading to substantially less signal jitter at the output terminal of the phase-locked loop.

Thus, a need exists to provide a voltage-to-current converter that has a substantially linear current/voltage characteristic over substantially the entire range of DC power supply voltage signal.

SUMMARY OF THE INVENTION

The present invention is directed to a voltage-to-current converter. In an exemplary embodiment, the converter is a rail-to-rail voltage-to-current converter for converting a variable differential voltage signal having a first and second voltage signal components, to an output current signal. The converter includes a first voltage-to-current converter configured to receive one of the voltage signal components and a reference voltage signal, to provide a first substantially linear output current signal. A second voltage-to-current converter receives the other one of the voltage signal components and the reference voltage signal, to provide a second substantially linear output current signal. An adder is configured to combine the first and second output current signals.

A voltage-to-current converter in accordance with the present invention has many benefits and advantages over conventional voltage-to-current converters. For example, it exhibits a linear current/voltage characteristic over substantially the entire range of input voltage signal. This characteristic allows for better performance in many electronic applications that employ a voltage-to-current converter. Furthermore, since the dynamic range of a voltage-to-current converter in accordance with the present invention is wider than conventional voltage-to-current converters, and provides a substantially rail-to-rail linear response, it is possible to use the converter in systems that use a smaller voltage signal supply, $V_{DD}$, than voltage signal supplies used in past systems.

DETAILED DESCRIPTION OF THE INVENTION

Figure 1:
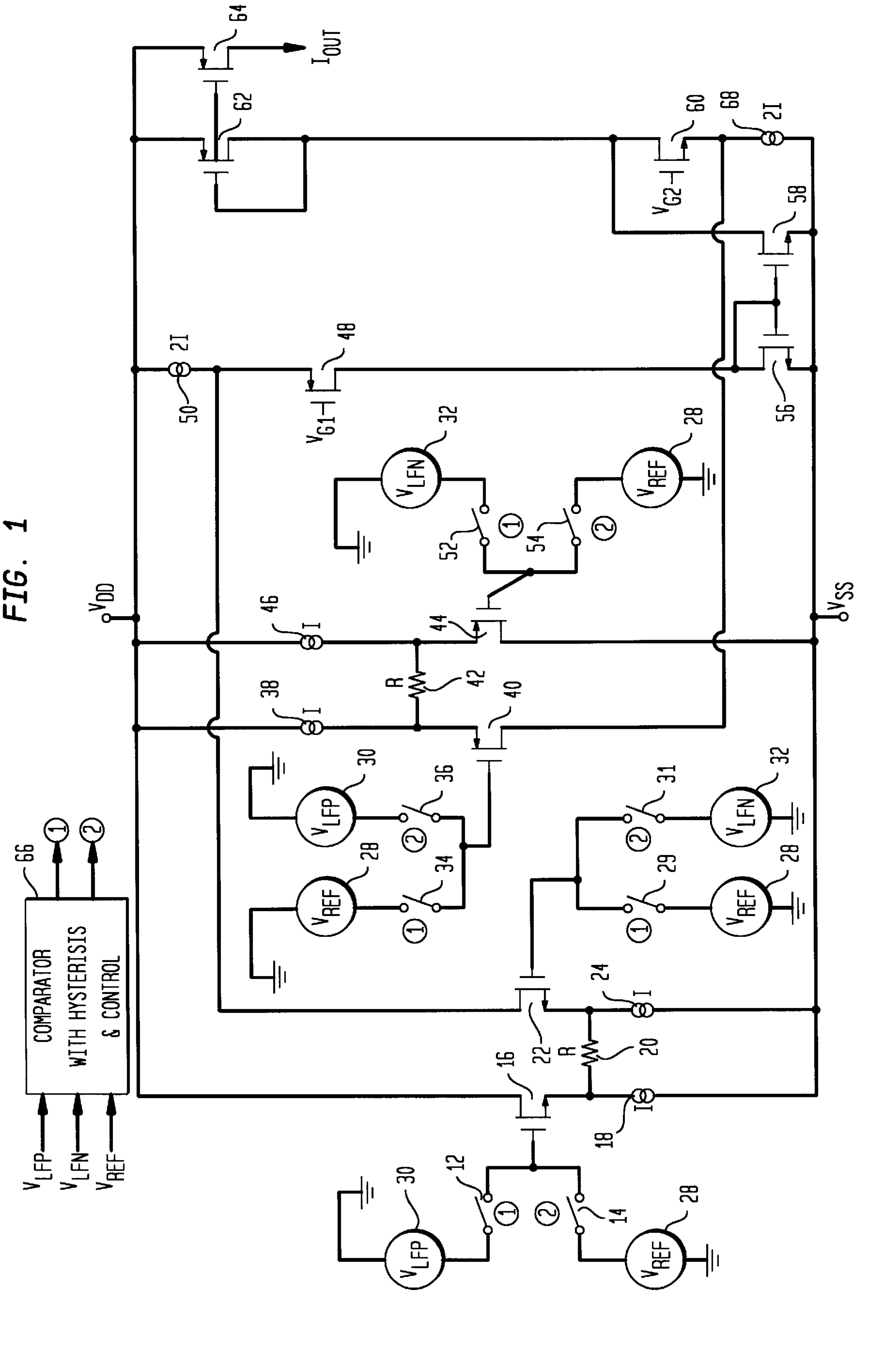
FIG. 1 illustrates a schematic diagram of one embodiment of a voltage-to-current converter in accordance with the present invention.

As previously indicated, a voltage-to-current converter in accordance with the invention, may be employed in a phase-locked loop, although the invention is not limited in scope in this respect. FIG. 1 illustrates a voltage-to-current converter, such as 10, in accordance with one exemplary embodiment of the present invention. Voltage-to-current converter 10 is configured to receive a differential input voltage signal having two voltage signal components, $V_{LFP}$ and $V_{LFN}$, respectively. It will be appreciated that circuits operating with differential architecture are substantially more immune to common mode noise. Thus, a voltage-to-current converter designed in accordance with the principles of the present invention is most desirable in situations where differential architecture is implemented. A rail-to-rail voltage-to-current converter that operates based on a single ended architecture is disclosed in U.S. application Ser. No. 08/509,072 filed Jul. 31, 1995 entitled "Voltage-to-Current Converter," and assigned to Lucent Technologies, Murray Hill, N.J., U.S.A., and is incorporated herein by reference.

It will be appreciated that voltage-to-current converter 10 may be implemented in an integrated circuit either independently or in combination with other circuits employed to interact with the voltage-to-current converter.

Voltage-to-current converter 10 includes a first voltage-to-current converter, which is configured in accordance with a conventional design comprising of two n-channel MOSFET transistors 16 and 22. The source terminals of these transistors are coupled to each other through a resistor 20. The source terminals of the transistors are also coupled to current source 18 and 24, which provide two current signals, I, of substantially the same value to each transistor 16 and 22, respectively. Current sources 18 and 24 may have one of the many available design arrangements, such as a MOSFET transistor operating in its saturation region or a BIPOLAR transistor operating in its active region. Typically, transistors operating in the aforesaid regions exhibit a substantially constant current signal for a wide range of voltage signal amplitudes across the transistor. The operation of such current sources is well-known and described, for example, in *Analog Integrated Circuits,* by Sidney Soclof (Prentice-Hall, 1985), incorporated herein by reference.

The gate terminal of transistor 16 is configured to receive voltage signal component, $V_{LFP}$, or a reference voltage signal, $V_{REF}$, via the activation of switches 12 or 14 respectively. Likewise the gate terminal of transistor 22 is configured to receive the reference voltage signal, $V_{REF}$, or voltage signal component, $V_{LFN}$, via the activation of switches 29 and 31 respectively. In the present context, voltage signal components, $V_{LFP}$, and, $V_{LFN}$ are components of any differential voltage signal, in response to which, a voltage-to-current converter generates an output current signal. The output current signal of the n-channel voltage-to-current converter at either drain terminals of transistors 16 or 22 varies in response to variations of input voltage signals, $V_{LFP}$, or, $V_{LFN}$.

The drain terminal of transistor 16 is preferably coupled to a DC voltage source signal, $V_{DD}$, which is configured to provide power to voltage-to-current converter 10. Furthermore, the drain terminal of transistor 22 is preferably coupled to a current source 50, which generates a current signal 2I, which is approximately twice as large as the current signal generated by current sources 18 or 24. The output terminal of current source 50 is coupled to the source terminal of a p-channel transistor 48, which is employed as a cascode device. The gate terminal of transistor 48 is configured to receive a biasing voltage signal $V_{G1}$. Current source 50 is employed to provide, as referred to in the art, a current steering mechanism. The purpose of cascode device 48 is to ensure that transistor 22 operates in its saturation region, and that it will not enter its triode region even when the voltage signal at the gate terminal of transistor 22 becomes approximately equal to the value of voltage source signal, $V_{DD}$. It is noted that transistor 16 maintains its saturation because its drain terminal is directly connected to the voltage signal source, $V_{DD}$.

Figure 2:
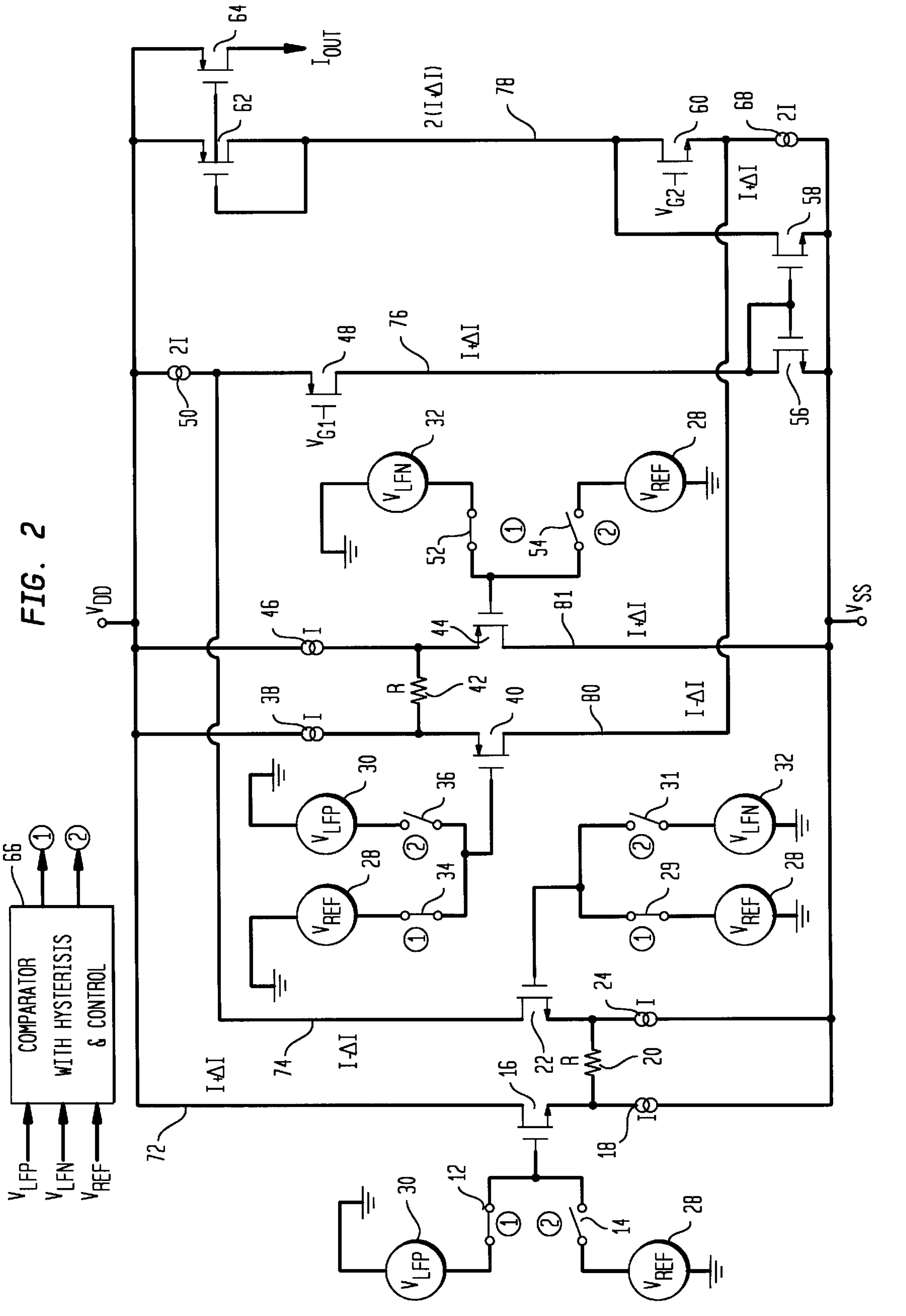
FIG. 2 illustrates a schematic diagram of the embodiment shown in FIG. 1, when operating in response to a given input voltage signal range.

As will be explained in more detail with reference to FIGS. 2 and 3, the current signal at the drain terminal of transistor 48 is substantially equal to the current signal at the drain terminal of transistor 16. A current mirror comprising of transistors 56 and 58 provide a current signal substantially equal to the current signal at the drain terminal of transistor 16 to a second current mirror comprising of transistors 62 and 64. Thus the current signal at the drain terminal of transistor 64 includes a current signal that is substantially equal to the current provided at the drain terminal of transistor 16.

Voltage-to-current converter 10 also includes a second voltage-to-current converter which is configured in accordance to a conventional design comprising of two p-channel MOSFET transistors 40 and 44. The source terminals of these transistors are coupled together through a resistor 42. The source terminals of the transistors are also coupled to current sources 38 and 46, which provide two current signals, I, of substantially the same amplitude, to each transistor 40 and 44, respectively.

The gate terminal of transistor 40 is configured to receive voltage signal component, $V_{LFP}$, or a reference voltage signal, $V_{REF}$, via the activation of switches 36 or 34 respectively. Likewise the gate terminal of transistor 44 is configured to receive the reference voltage signal, $V_{REF}$, or voltage signal component, $V_{LFN}$, via the activation of switches 54 and 52 respectively. The output current signal of the p-channel voltage-to-current converter at either drain terminals of transistors 40 or 44 varies in response to variations of input voltage signal, $V_{LFP}$ or, $V_{LFN}$.

The drain terminal of transistor 44 is preferably coupled to ground or to the lowest DC voltage source signal, $V_{ss}$, which is configured to provide power to voltage-to-current converter 10. The drain terminal of transistor 40 is preferably coupled to a current source 68, which generates a constant current signal twice as large as the current signal generated by current sources 38 or 46. The output terminal of current source 68 is coupled to the source terminal of an n-channel transistor 60. The gate terminal of transistor 60 is configured to receive a biasing voltage signal $V_{G2}$. The purpose of current source 68 is to ensure that transistor 40 operates in its saturation region, even when the voltage signal at the gate terminal of transistor 40 becomes approximately equal to the value of the lowest voltage source signal, $V_{SS}$, or ground level. It is noted that transistor 44 maintains its saturation because its drain terminal is directly connected to the voltage signal source, Vss, or alternatively to ground level.

As will be explained in more detail with reference to FIGS. 2 and 3, the current signal at the drain terminal of transistor 60 is substantially equal to the current signal at the drain terminal of transistor 44. A current mirror comprising of transistors 62 and 64 provide a current signal substantially equal to the current signal at the drain terminal of transistor 60. Thus the current signal at the drain terminal of transistor 64 includes a current signal that is substantially equal to the current provided at the drain terminal of transistor 44. It is noted that transistor 64 provides a current signal, which is equal to the sum of current signals generated at the drain terminals of transistors 16 and 44, as will be explained in more detail with reference to FIGS. 2 and 3.

Voltage-to-current converter 10 also includes a comparator 66, for controlling the activation of switches 12, 14, 29, 31, 34, 36, 52 and 54. Comparator 66 preferably receives the voltage signal components, $V_{LFP}$, and, $V_{LFN}$, and a reference voltage signal, $V_{REF}$, which preferably, has an amplitude substantially equal to the average of voltage signal components, $V_{LFP}$ and, $V_{LFN}$. In response to the input voltage signal, comparator 66 generates two control signals for activating the switches that provide voltage signals to the first and second voltage-to-current converters described above.

When voltage signal component, $V_{LFP}$, is larger than reference voltage signal, $V_{REF}$, comparator 66 generates control signals for activating switches 12, 29, 34 and 52, and deactivating switches 14, 31, 36 and 54. When voltage signal component, $V_{LFN}$, is larger than the reference voltage signal $V_{REF}$, comparator 66 generates control signals for activating switches 14, 31, 36 and 54, and deactivating switches 12, 29, 34 and 52.

Figure 5:
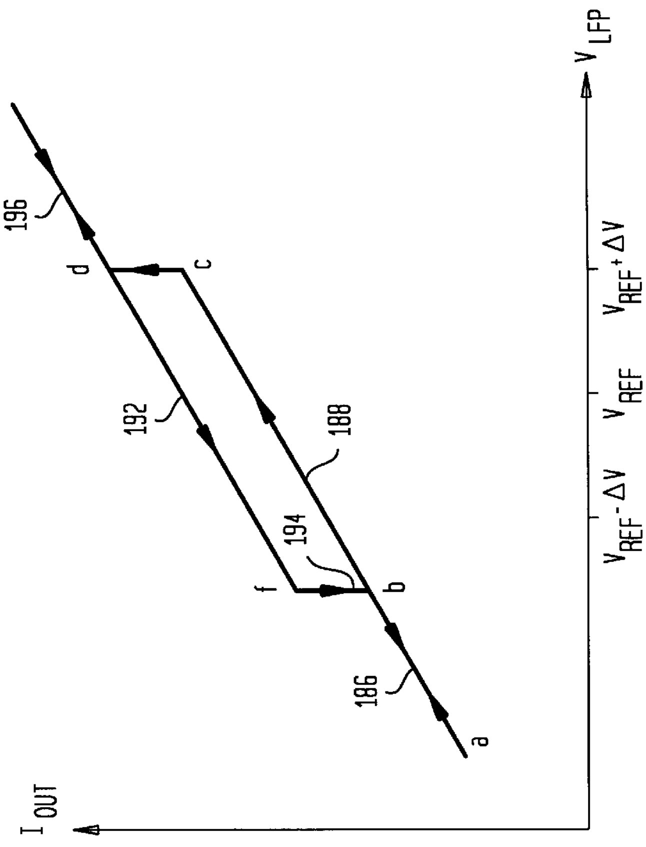
FIG. 5 is a plot illustrating an hysterisis loop employed in one embodiment of a voltage-to-current converter in accordance with the present invention.

Comparator 66 also includes a hysterisis loop to substantially eliminate any oscillation or chattering, when voltage signal components are substantially equal to each other. One example of such an hysterisis loop is described in the above-reference United States patent application Ser. No. 08/509,072, assigned to the same assignee as the present invention. FIG. 5 illustrates the effect of such a hysterisis loop, which may be introduced into the current/voltage characteristic of an embodiment of a voltage-to-current converter in accordance with the present invention. In FIG. 5, the central region of the curve is expanded for more clarity. As illustrated, the output current signal, $I_{OUT}$, remains substantially chatter-free. For input voltage signals, $V_{LFP}$, rising from zero volts to $V_{REF}+\Delta v$ the output current signal follows path abcde along the hysterisis loop. Conversely, for input voltage signals $V_{LFP}$, decreasing from $V_{DD}$ toward $V_{REF}-\Delta v$, the output current signal follows path edfba along the hysterisis loop. The amount of hysterisis is such that the discontinuity cd is contained within the segment df, and the discontinuity of fb is contained within the segment bc.

The operation of voltage-to-current converter 10 in accordance with one embodiment of the present invention is described hereinafter in reference with FIGS. 2 and 3. FIG. 2 illustrates the configuration of the converter, when voltage signal component $V_{LFP}$ is larger than reference voltage signal $V_{REF}$. It follows that voltage signal component $V_{LFN}$ is smaller than the reference voltage signal $V_{REF}$. As illustrated in FIG. 2, the gate terminal of transistor 16 is coupled to voltage signal component $V_{LFP}$. The gate terminals of transistors 22 and 40 are both coupled to reference voltage signal $V_{REF}$. Finally, the gate terminal of transistor 44 is coupled to the voltage signal component, $V_{LFN}$.

During operation, because the gate terminal of transistor 16 receives a voltage signal, $V_{LFP}$, which is larger than the reference voltage signal,$V_{REF}$, transistor 16 provides a current signal approximately equal to I+ΔI, and transistor 22 provides a current signal approximately equal to I−ΔI, on lines 72 and 74 respectively. Furthermore, transistor 40 provides a current signal approximately equal to I−ΔI, and transistor 44 provides a current signal approximately equal to I+Δl on lines 80 and 81, respectively.

The current signal at the drain terminal of transistor 48 is approximately equal to I+ΔI, which is mirrored via transistors 56, 58 and 62, 64. Thus, the current signal at the drain terminal of transistor 64 includes a current signal component approximately equal to I+ΔI. The current signal at the drain terminal of transistor 60 is approximately equal to I+ΔI, which is mirrored via transistors 62 and 64. Thus, the current signal at the drain terminal of transistor 64 includes another current signal component approximately equal to I+ΔI. To this end, the output current signal, $I_{OUT}$, of voltage-to-current converter 10 is approximately equal to 2 (I+ΔI). It is noted that for the voltage signals $V_{LFP}$ that range from approximately equal to $V_{REF}$ to a voltage signal, $V_{DD}$, generated by a DC power supply, transistors 16, 22, 40 and 44 operate substantially in their linear region. The same is true for $V_{LFN}$ ranging from ground level or $V_{SS}$ to $V_{REF}$. Also, current sources 18, 24, 38 and 46 have sufficient voltage across them so that they operate as constant current sources.

Figure 3:
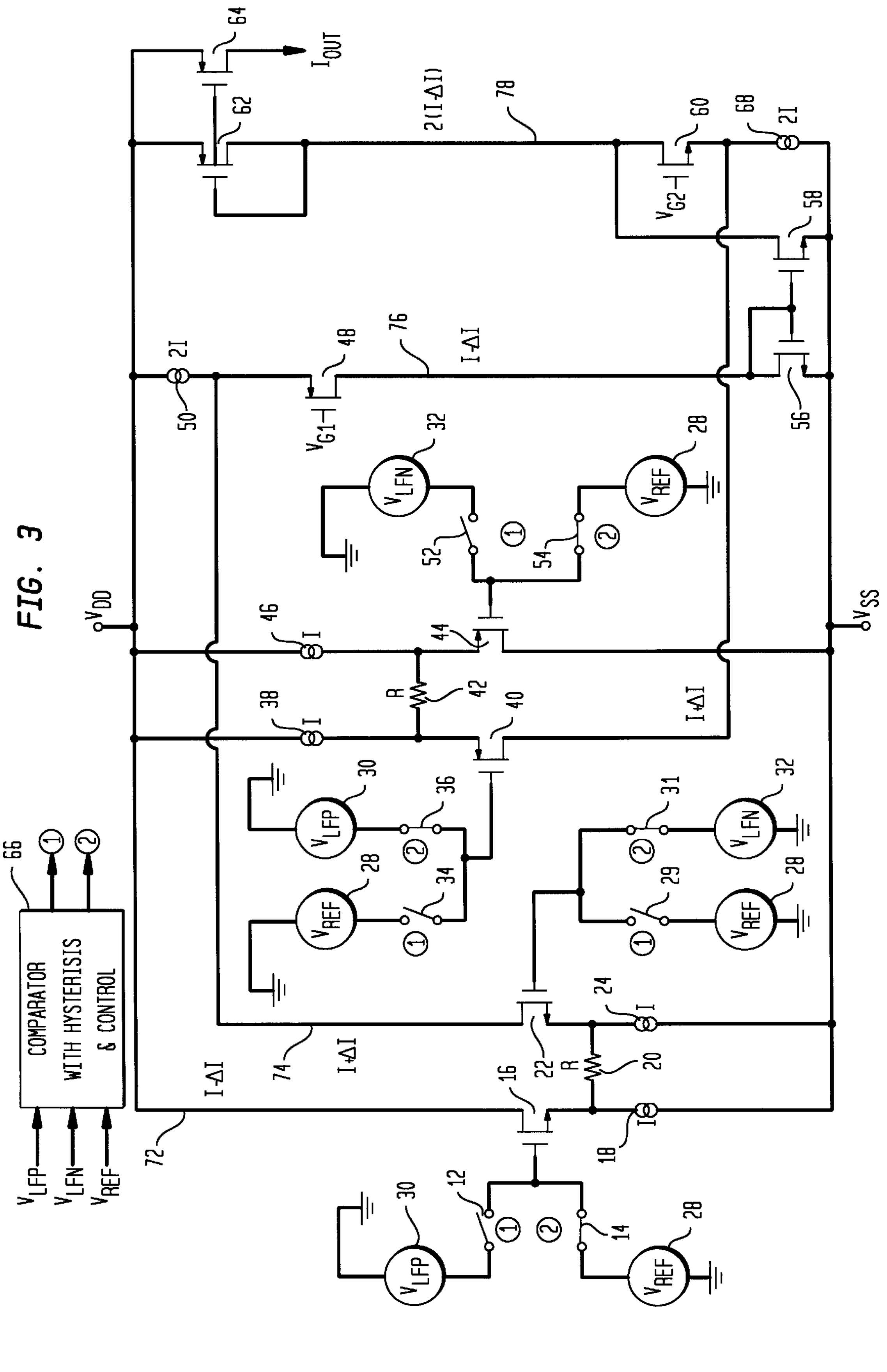
FIG. 3 illustrates a schematic diagram of the embodiment shown in FIG. 1, when operating in response to another given input voltage signal range.

FIG. 3 illustrates the configuration of voltage-to-current converter 10 in accordance with the present invention, for a duration when voltage signal component, $V_{LFN}$, becomes larger than reference voltage signal, $V_{REF}$, and voltage signal component, $V_{LFP}$, becomes smaller than the reference voltage signal, $V_{REF}$. The gate terminal of transistor 22 is coupled to the voltage signal component,$V_{LFN}$. The gate terminals of transistors 16 and 44 are both coupled to the reference voltage signal $V_{REF}$. Finally, the gate terminal of transistor 40 is coupled to the voltage signal component, $V_{LFP}$.

During operation, because the gate terminal of transistor 22 receives a voltage signal $V_{LFN}$, which is larger than the reference voltage signal,$V_{REF}$, transistor 22 provides a current signal approximately equal to I+ΔI, and transistor 16 provides a current signal approximately equal to I−ΔI, on lines 74 and 72 respectively. Furthermore, transistor 40 provides a current signal approximately equal to I+ΔI, and transistor 44 provides a current signal approximately equal to I−ΔI on lines 80 and 81 respectively.

The current signal at the drain terminal of transistor 48 is approximately equal to I−ΔI, which is mirrored via transistors 56, 58 and 62, 64. Thus, the current signal at the drain terminal of transistor 64 includes a current signal component approximately equal to I−ΔI. The current signal at the drain terminal of transistor 60 is approximately equal to I−ΔI, which is mirrored via transistors 62 and 64. Thus, the current signal at the drain terminal of transistor 64 includes another current signal component approximately equal to I−ΔI. To this end, the output current signal, $I_{OUT}$, of voltage-to-current converter 10 is approximately equal to 2 (I−ΔI). It is noted that for the voltage signals $V_{LFN}$ that range from approximately equal to $V_{REF}$ to a voltage signal, $V_{DD}$, generated by a DC power supply, transistors 16, 22, 40 and 44 operate substantially in their linear region. The same is true for $V_{LFP}$ ranging from ground level to $V_{REF}$. Also, current sources 18, 24, 38, and 46 have sufficient voltages across them that they operate as constant current sources.

Figure 4:
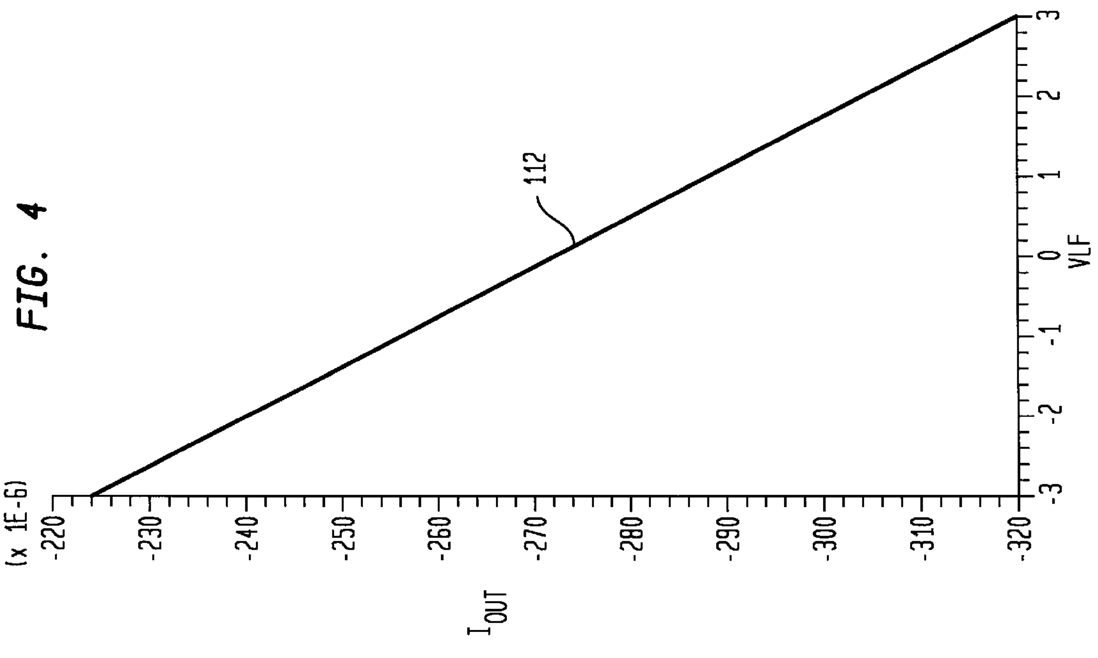
FIG. 4 is a plot illustrating the current/voltage characteristic of the embodiment of FIG. 1.

FIG. 4 is a plot illustrating the voltage/current characteristic of a computer simulated voltage-to-current converter in accordance with one embodiment of the present invention. For this simulation the circuit was designed to receive power from a 3 Volts power supply. The $V_{SS}$ terminal was connected to the ground level. On the x-axis, the difference $[V_{LFP}-V_{LFN}]=V_{LF}$, is plotted. As illustrated by curve 112, the voltage/current characteristic exhibits a substantially linear response for voltage range up to power supply voltage level. Furthermore, the operation of switches 12, 14, 29, 31 , 34, 36, 52 and 54 is such that the output current signal for both n-channel and p-channel voltage-to-current converters combine constructively.

It will be appricated that the present invention is not limited in scope to MOSFET transistors, and other types of semiconductor devices may be advantageously employed in accordance with the principles of the invention.

It will be further appreciated that an embodiment of a voltage-to-current converter in accordance with the present invention may be used, for example, in a phase-locked loop, which typically comprises a phase detector, a charge pump, a loop filter, and a controlled oscillator. The output of the charge-pump when coupled to the loop-filter results in a voltage which indirectly controls the oscillator frequency. This voltage is then provided to the voltage-to-current converter of the present invention to generate a responsive current that controls the oscillator. The linear transfer characteristics of the voltage-to-current converter of the present invention allows the oscillator to substantially maintain constant loop dynamics.

While only certain features of the invention have been illustrated and described herein, many modifications, substitutions, changes or equivalents will now occur to those skilled in the art. It is therefore, to be understood that the appended claims are intended to cover all such modifications and changes as fall within the true spirit of the invention.

I claim:

1. A voltage-to-current converter for converting a differential voltage signal having a first and second voltage signal components, to an output current signal, comprising:

a first differential voltage-to-current converter configured to receive one of said first and second voltage signal components and a reference voltage signal, to provide a first substantially linear output current signal;

a second differential voltage-to-current converter configured to receive the other one of said first and second voltage signal components and said reference voltage signal, to provide a second substantially linear output current signal; and an adder configured to receive said first and second output current signals and to provide said output current signal.

2. The invention in accordance with claim 1, wherein the voltage-to-current converter is a rail-to-rail converter.

3. The rail-to-rail voltage to current converter in accordance with claim 2, further comprising a comparator configured to receive said first and said second signal components so as to generate a first control signal, when said first voltage signal component is larger than a predetermined reference voltage signal, and to generate a second control signal, when said second voltage signal component is larger than said predetermined reference voltage signal.

4. The rail-to-rail voltage-to-current converter in accordance with claim 3 further comprising a plurality of switches responsive to said first and second control signals so that in response to said first control signal said first differential voltage-to-current converter receives said first input voltage signal component and said reference voltage signal and said second differential voltage to current converter receives said second input voltage signal component and said reference voltage signal.

5. The rail-to-rail voltage-to-current converter in accordance with claim 4, wherein said plurality of switches are responsive to said first and second control signals so that in response to said second control signal said first differential voltage to current converter receives said second input voltage signal component and said reference voltage signal and said second differential voltage to current converter receives said first input voltage signal component and said reference voltage signal.

6. The rail-to-rail voltage-to-current converter in accordance with claim 3, wherein said comparator includes means for providing a hysterisis loop.

7. The rail-to-rail voltage-to-current converter in accordance with claim 3, further comprising a current steering mechanism coupled to said first and second voltage-to-current converters so that said first and second voltage-to-current converters operate substantially linearly.

8. The rail-to-rail voltage-to-current converter in accordance with claim 7, wherein said current steering mechanism comprises a current source.

9. The rail-to-rail voltage-to-current converter in accordance with claim 3, wherein the amplitude of said reference voltage signal is substantially equal to the average of said first and second voltage signal components.

10. A voltage-to-current converter for converting a differential input voltage signal, having a first and a second input voltage signal components, to an output current signal, comprises:

an n-channel voltage-to-current converter configured to receive said first input voltage signal component and a reference voltage signal, when said first input voltage signal component is larger than said reference voltage, and further configured to provide a current signal having a first polarity, said first n-channel voltage-to current converter further configured to receive said second input voltage signal component and said reference voltage signal, when said second input voltage signal is larger than said reference voltage signal and further configured to provide a current signal having a second polarity;

a p-channel voltage-to-current converter configured to receive said second input voltage signal component and said reference voltage signal, when said first input voltage signal component is larger than said reference voltage signal, and further configured to provide a current signal having said first polarity, said p-channel voltage to current converter further configured to receive said first input voltage signal component and said reference voltage signal, when said second input voltage signal is larger than said reference voltage signal, and further configured to provide a current signal having said second polarity; and an adder configured to receive said current signals provided by said n-channel and p-channel voltage to current converters.

11. The voltage-to-current converter in accordance with claim 10, further comprising a comparator configured to receive said first and said second voltage signal components so as to generate a first control signal, when said first voltage signal component is larger than said reference voltage signal, and to generate a second control signal, when said second voltage signal component is larger than said reference voltage signal.

12. The rail-to-rail voltage-to-current converter in accordance with claim 11 further comprising a plurality of switches responsive to said first and second control signals so that in response to said first control signal said first differential voltage to current converter receives said first input voltage signal component and said reference voltage signal and said second differential voltage to current converter receives said second input voltage signal component and said reference voltage signal.

13. The rail-to-rail voltage-to-current converter in accordance with claim 12, wherein said plurality of switches are responsive to said first and second control signals so that in response to said second control signal said first differential voltage to current converter receives said second input voltage signal component and said reference voltage signal and said second differential voltage to current converter receives said first input voltage signal component and said reference voltage signal.

14. The rail-to-rail voltage-to-current converter in accordance with claim 11, wherein said comparator includes means for providing a hysterisis loop.

15. The rail-to-rail voltage-to-current converter in accordance with claim 11, further comprising a current steering mechanism coupled to said first and second voltage-to-current converters so that said first and second voltage-to-current converters operate substantially linearly.

16. The rail-to-rail voltage-to-current converter in accordance with claim 15, wherein said current steering mechanism comprises a current source.

17. The rail-to-rail voltage-to-current converter in accordance with claim 11, wherein the amplitude of said reference voltage signal is substantially equal to the average of said first and second voltage signal components.

18. A voltage-to-current converter for converting a variable differential pair voltage signal having a first and second voltage signal components, to an output current signal, comprising:

a first means for converting the difference between one of said first and second voltage signal components and a reference voltage signal to a first substantially linear output current signal;

a second means for converting the difference between the other one of said first and second voltage signal components and said reference voltage signal to a second substantially linear output current signal;

means for combining said first and second output current signals.

* * * * *